Nov. 8, 1960
G. H. COOK
2,959,102
OPTICAL OBJECTIVES
Filed Dec. 2, 1957
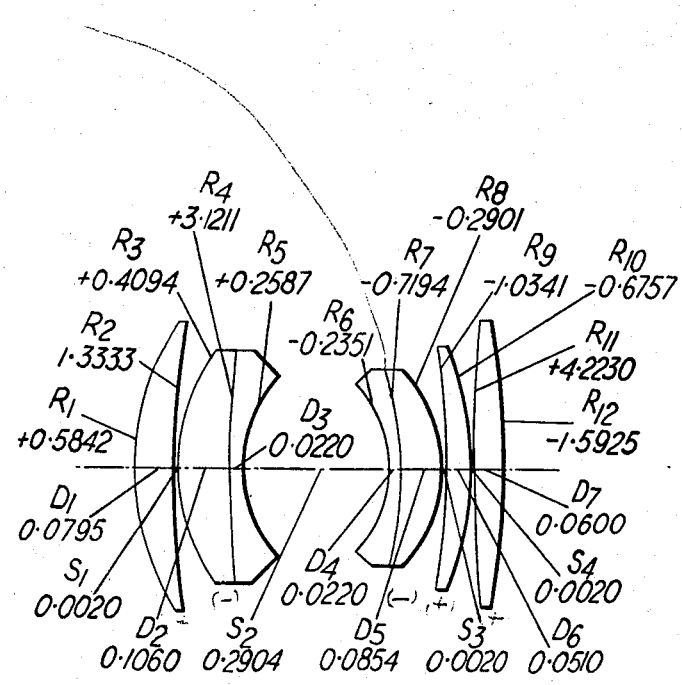
Gordon Henry Cook, *Inventor*
By Holcombe, Wetherill & Brisebois, *Attorneys*

United States Patent Office 2,959,102
Patented Nov. 8, 1960

2,959,102

OPTICAL OBJECTIVES

Gordon Henry Cook, Leicester, England, assignor to Taylor, Taylor & Hobson Limited, Leicester, England, a British company Filed Dec. 2, 1957, Ser. No. 700,145

Claims priority, application Great Britain Dec. 4, 1956

15 Claims. (Cl. 88—57)

This invention relates to an optical objective, more especially though not exclusively for photographic purposes, of the kind corrected for spherical and chromatic aberrations, coma, astigmatism, field curvature and distortion, and comprising two compound meniscus components having their air-exposed surfaces concave towards a diaphragm between them and disposed between simple collective components. Objectives of this kind having four components have been known for a long time and have been developed to give a high degree of correction for all the primary aberrations. Various modifications of the simple four-component objective of this kind have been proposed, often involving five or more components instead of four, in order to give good correction for zonal spherical aberration in an objective having a higher relative aperture than that of the four-component objectives. For an objective having a wide angle of view, however, it is important to achieve good correction for oblique aberrations, particularly oblique spherical aberration, astigmatism and coma. Hitherto, in objectives of the present kind having a wide angle of view, it has not been possible to achieve a high degree of correction for oblique aberrations except at the expense of reduced correction for crtain other aberrations, particulaly zonal spherical aberration.

The present invention has for its object to provide a further improvement in an objective of this kind, wherein a high degree of correction for the oblique aberrations with maximum freedom from vignetting can be obtained over a wide angle of view, say, greater than 20 degrees semi-angle, for a medium relative aperture, say, between F/1.8 and F/3.0, whilst maintaining also a high degree of correction for zonal spherical aberration and for the primary aberrations. Such an objective is usual as a standard objective for a wide range of photographic purposes, not involving long focal lengths.

The objective according to the present invention comprises two compound meniscus components having their air-exposed surfaces concave to a diaphragm between them, a simple collective component in front of such compound components, and two simple collective components behind such compound components, the numerical sum of the radii of curvature of the rear surface of the front compound meniscus component and of the front surface of the rear compound meniscus component lying between 1.33 and 2.33 times the axial length of the air space between such surfaces, whilst the axial thickness of the front compound meniscus component lies between 0.1 F and 0.16 F, and the axial thickness of the rear compound component lies between 0.08 F and 0.14 F, where F is the equivalent focal length of the whole objective.

It is to be understood that the terms "front" and "rear" are used herein in their usual significance to refer to the sides of the objective respectively nearer to and further from the longer conjugate, so that when the objective is used for photographic purposes, the light passes through the objective from front to rear.

For maintaining correction of zonal spherical aberration, the radius of curvature of the rear surface of the rear compound meniscus component preferably lies between 0.2 F and 0.4 F, and the power of such surface preferably lies between 8 and 12 times the reciprocal of the sum of the equivalent focal lengths of the two simple rear components. Such rear compound meniscus component will usually be in the form of a doublet, in which case, to contribute to the correction of oblique aberrations and other secondary higher order aberrations including higher order coma, the mean refractive indices of the materials of its two elements preferably differ from one another by less than 0.04, the internal contact surface between such elements being concave to the front with radius of curvature between 0.5 F and 2 F.

It is to be understood that the power of a surface is the quantity defined mathematically by the expression $(n^1-n)/R$, where $n$ and $n^1$ are the mean refractive indices of the materials respectively in front of and behind the surface, and R is the radius of curvature of the surface regarded as positive if the surface is convex to the front and negative if the surface is concave to the front, the power being collective or dispersive in accordance with whether such mathematical expression is positive or negative.

The power of the front surface of the front compound meniscus component preferably lies between 2 and 3 times the equivalent power of the front simple collective component. Such front compound meniscus component will usually be in the form of a doublet, in which case to contribute towards the correction of oblique aberrations including higher order coma, whilst helping to maintain correction for field curvature and chromatic aberrations, the mean refractive index of the material of the front element preferably exceeds that of the rear element by an amount lying between 0.06 and 0.12, the internal contact surface between them being convex to the front with radius of curvature between 1.5 F and 5 F.

For the avoidance of vignetting, it is convenient to make the clear apertures of the front surface of the front doublet meniscus component and the rear surface of the rear doublet meniscus component the limiting apertures for oblique pencils.

The sum of the equivalent powers of the two compound meniscus components preferably lies between —0.6 and —0.4 times the equivalent power of the whole objective, whilst the equivalent focal length of the simple collective fourth component preferably lies between 1.2 and 2.0 times that of the simple collective rear component, the sum of such equivalent focal lengths lying between 3 F and 6 F.

Conveniently, to assist in the correction of astigmatism and secondary and higher order aberrations, the front and rear surfaces of the simple collective fourth component are concave to the front with radii of curvature respectively between 0.5 F and 3 F and between 0.4 F and F, whilst the front and rear surfaces of the simple collective rear component are respectively convex and concave to the front with radii of curvature between 2 F and ∞ and between F and 2 F.

Again for assisting in astigmatic correction, the rear surface of the simple collective front component is conveniently convex to the front with radius of curvature between 0.7 and 1.5 times the equivalent focal length of such component, such equivalent focal length lying between 1.25 F and 1.75 F.

The accompanying drawing shows one convenient practical example of objective according to the invention and numerical data for such example are given in the following table, in which $R_1$, $R_2$ ... represent the radii of curvature of the individual surfaces (the positive sign indicating that the surface is convex to the front and the negative sign that it is concave thereto), $D_1$, $D_2$ . . . represent the axial thicknesses of the elements, and $S_1$, $S_2$ . . . represent the axial air separations between components. The table also gives the mean refractive indices $n_d$ for the $d$-line and the Abbé V numbers of the materials used for the elements of the objective.

The insertion of equals (=) signs in the radius columns of the table, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the table may have to be treated as negative for some calculations as is well understood in the art.

[Equivalent focal length 1.000. Relative aperture F/2.0]

| Radius | Thickness or Air Separation | Refractive Index $n_d$ | Abbé V Number |
|---|---|---|---|
| $R_1 = +0.5842$ | | | |
| | $D_1 = 0.0795$ | 1.6935 | 53.50 |
| $R_2 = +1.3333$ | | | |
| | $S_1 = 0.0020$ | | |
| $R_3 = +0.4094$ | | | |
| | $D_2 = 0.1060$ | 1.6935 | 53.50 |
| $R_4 = +3.1211$ | | | |
| | $D_3 = 0.0220$ | 1.6083 | 39.58 |
| $R_5 = +0.2587$ | | | |
| | $S_2 = 0.2904$ | | |
| $R_6 = -0.2351$ | | | |
| | $D_4 = 0.0220$ | 1.7003 | 30.28 |
| $R_7 = -0.7194$ | | | |
| | $D_5 = 0.0854$ | 1.6935 | 53.50 |
| $R_8 = -0.2901$ | | | |
| | $S_3 = 0.0020$ | | |
| $R_9 = -1.0341$ | | | |
| | $D_6 = 0.0510$ | 1.6935 | 53.50 |
| $R_{10} = -0.6757$ | | | |
| | $S_4 = 0.0020$ | | |
| $R_{11} = +4.2230$ | | | |
| | $D_7 = 0.0600$ | 1.6935 | 53.50 |
| $R_{12} = -1.5925$ | | | |

In this example the objective is corrected over the wide semi-angular field of 25 degrees with respect to a diaphragm located in the air space between the two compound meniscus components in a position 0.1474 F in front of the surface $R_6$.

The numerical sum of the radii $R_5$ and $R_6$ is 0.4938 F, which is 1.70 times the axial air space $S_2$. These radii are unusually small in an objective of the present kind having an aperture as high as F/2.0, and the small values of such radii $R_5$ and $R_6$ enable the axial air space $S_2$ to be not objectionably large. In addition, the axial thicknesses of the compound meniscus components are slightly smaller than is usual, that of the front compound meniscus component being 0.1280 F and that of the rear compound meniscus component being 0.1074 F, so that the axial distance between the surfaces $R_3$ and $R_8$ is somewhat reduced in the present objective and indeed rather more reduced than the above relationship between $R_5$, $R_6$ and $S_2$ would suggest.

The relatively small axial distance between the surfaces $R_3$ and $R_8$, in conjunction with the small radii $R_5$ and $R_6$, tends to introduce an undesirable amount of zonal spherical aberration. This is, however, largely overcome by giving high optical power to the surfaces $R_3$ and $R_8$, especially the latter. Further, the rather large axial air space $S_2$, in conjunction with the small radii $R_5$ and $R_6$, tends to introduce an undesirable amount of astigmatism. The high optical power of the surfaces $R_3$ and $R_8$, together with features of the simple outer components, are utilised to compensate for this. In the example the power of the surface $R_3$ is 1.694/F, which is 2.434 times the equivalent power of the front simple convergent component, whilst the power of the surface $R_8$ is 2.391/F, which is 10.36 times the reciprocal of the sum of the equivalent focal lengths of the two rear simple convergent components.

The two surfaces $R_3$ and $R_8$ are arranged to have clear diameters bearing such relation to the diameters of the other surfaces that these two clear apertures act as the limiting apertures for oblique beams. The somewhat reduced axial distance between these surfaces $R_3$ and $R_8$, in conjunction with the deep curvatures of the surfaces $R_3$ and $R_8$ results in these effective limiting apertures for oblique beams being brought closer together, so that it is possible significantly to reduce vignetting in this manner without sacrificing aberration correction. In the example the clear diameters of the five components of the objective reading from the front to the rear are 0.570 F, 0.463 F, 0.391 F, 0.482 F and 0.547 F whilst the chamfer diameters of the surfaces $R_5$ and $R_6$ are respectively 0.361 F and 0.329 F.

The radii of curvature of the surfaces of the simple components are also important in aberration correction, particularly astigmatic correction, over the wide angular field of the present objective. Thus, in particular, the radius of curvature of the surface $R_2$ is equal to 0.9278 times the equivalent focal length of the front simple component.

Suitable choice of glasses used for the elements of the two doublet components which are both dispersive, is also important, in conjunction with the above-mentioned features, in the correction of secondary and higher order aberrations including oblique aberrations whilst maintaining correction of field curvature, chromatic aberrations and especially for comatic aberrations. Thus, in the front compound meniscus component, which like the rear compound meniscus component, is a doublet, the mean refractive index of the material of the front element is 0.0852 greater than the mean refractive index of the material of the rear element. In the rear meniscus doublet component, the refractive indices of the materials of the elements differ by 0.0068.

Further contributions towards the correction of secondary and higher order aberrations are obtained from suitable choice of the equivalent focal lengths of the three simple components. In the example, the equivalent focal length of the front simple component is 1.437 F, so that the equivalent power of such component is 0.696/F. The equivalent focal lengths of the simple fourth and fifth components are respectively 2.656 F and 1.675 F, the former being 1.585 times the latter, so that the sum of the equivalent focal lengths of such two components is 4.331 F. For further aberration correction the powers of the dispersive meniscus doublet components are important. The equivalent focal lengths of the front and rear meniscus doublet components in the example are respectively 2.642 F and 7.736 F, the sum of the equivalent powers of such components being −0.508/F.

The objective in the example has a back focal distance of 0.7017 F.

What I claim as my invention and desire to secure by Letters Patent is:

1. An optical objective corrected for spherical and chromatic aberrations, coma, astigmatism, field curvature and distortion comprising two compound meniscus components having their air-exposed surfaces concave to a diaphragm between them, a simple collective component in front of such compound components, and two simple collective components behind such compound components, the radius of curvature of the rear surface of the rear compound meniscus component lying between 0.2 F and 0.4 F, and the power of such surface lying numerically between 8 and 12 times the reciprocal of the sum of the equivalent focal lengths of the two simple rear components, the numerical sum of the radii of curvature of the rear surface of the front compound meniscus component and the front surface of the rear compound meniscus component lying between 1.33 and 2.33 times the axial length of the air space between such surfaces, while the axial thickness of the front compound meniscus component lies between 0.1 F and 0.16 F and the axial thickness of the rear compound meniscus component lies between 0.08 F and 0.14 F, where F is the equivalent focal length of the whole objective.

2. An optical objective as claimed in claim 1, in which the power of the front surface of the front compound meniscus component lies between 2 and 3 times the equivalent power of the front simple collective component.

3. An optical objective as claimed in claim 2, in which the rear surface of the simple collective front component is convex to the front and has radius of curvature lying between 0.7 and 1.5 times the equivalent focal length of such component, such equivalent focal length lying between 1.25 F and 1.75 F.

4. An optical objective as claimed in claim 3, in which the front compound meniscus component is a doublet in which the mean refractive index of the material of the front element exceeds that of the rear element by an amount lying between 0.06 and 0.12, the internal contact surface between such elements being convex to the front and having radius of curvature lying between 1.5 F and 5 F, and the rear compound meniscus component is a doublet in which the mean refractive indices of the materials of its two elements differ from one another by an amount less than 0.04, the internal contact surface between such elements being concave to the front and having radius of curvature lying between 0.5 F and 2 F.

5. An optical objective as claimed in claim 1, in which the rear surface of the simple collective front component is convex to the front and has radius of curvature lying between 0.7 and 1.5 times the equivalent focal length of such component, such equivalent focal length lying between 1.25 F and 1.75 F.

6. An optical objective as claimed in claim 1, in which the rear compound meniscus component is a doublet in which the mean refractive indices of the materials of its two elements differ from one another by an amount less than 0.04 whilst the internal contact surface between such elements is concave to the front and has radius of curvature lying between 0.5 F and 2 F.

7. An optical objective as claimed in claim 1, in which the front compound meniscus component is a doublet in which the mean refractive index of the material of the front element exceeds that of the rear element by an amount lying between 0.06 and 0.12, whilst the internal contact surface between such elements is convex to the front and has radius of curvature lying between 1.5 F and 5 F.

8. An optical objective as claimed in claim 1, in which the front and rear surfaces of the simple collective fourth component are concave to the front and have radii of curvature respectively lying between 0.5 F and 3 F and between 0.4 F and F, whilst the front and rear surfaces of the simple collective rear component are respectively convex and concave to the front and have radii of curvature respectively lying between 2 F and ∞ and between F and 2 F.

9. An optical objective as claimed in claim 1, in which the sum of the equivalent powers of the two compound meniscus components is dispersive and lies numerically between 0.4 and 0.6 times the convergent equivalent power of the whole objective, whilst the equivalent focal length of the simple collective fourth component lies between 1.2 and 2.0 times that of the simple collective rear component, the sum of such equivalent focal lengths lying between 3 F and 6 F.

10. An optical objective as claimed in claim 1, in which the rear surface of the simple collective front component is convex to the front and has a radius of curvature lying between 0.7 and 1.5 times the equivalent focal length of such component, such equivalent focal length lying between 1.25 F and 1.75 F, and the rear compound menicus component is a doublet in which the mean refractive indices of the materials of its two elements differ from one another by an amount less than 0.04 whilst the internal contact surface between such elements is concave to the front and has radius of curvature lying between 0.5 F and 2 F.

11. An optical objective as claimed in claim 1, in which the rear surface of the simple collective front component is convex to the front and has a radius of curvature lying between 0.7 and 1.5 times the equivalent focal length of such component, such equivalent focal length lying between 1.25 F and 1.75 F, and the front compound meniscus component is a doublet in which the mean refractive index of the material of the front element exceeds that of the rear element lying between 0.06 and 0.12, whilst the internal contact surface between such elements is convex to the front and has radius of curvature lying between 1.5 F and 5 F.

12. An optical objective corrected for spherical and chromatic aberrations, coma, astigmatism, field curvature and distortion comprising two compound meniscus components having their air-exposed surfaces concave to a diaphragm between them, a simple collective component in front of such compound components, and two simple collective components behind such compound components, the power of the front surface of the front compound meniscus component lying between 2 and 3 times the equivalent power of the front simple collective component, the rear surface of the simple collective front component being convex to the front and having a radius of curvature lying between 0.7 and 1.5 times the equivalent focal length of such component, such equivalent focal length lying between 1.25 F and 1.75 F, the numerical sum of the radii of curvature of the rear surface of the front compound meniscus component and the front surface of the rear compound meniscus component lying between 1.33 and 2.33 times the axial length of the air space between such surfaces, while the axial thickness of the front compound meniscus component lies between 0.1 F and 0.16 F and the axial thickness of the rear compound meniscus component lies between 0.08 F and 0.14 F, where F is the equivalent focal length of the whole objective, the front compound meniscus component being a doublet in which the mean refractive index of the material of the front element exceeds that of the rear element by an amount lying between 0.06 and 0.12, the internal contact surface between such elements being convex to the front and having radius of curvature lying between 1.5 F and 5 F, and the rear compound menicus component being a doublet in which the mean refractive indices of the materials of its two elements differ from one another by an amount less than 0.04, the internal contact surface between such elements being concave to the front and having radius of curvature lying between 0.5 F and 2 F.

13. An optical objective corrected for spherical and chromatic aberrations, coma, astigmatism, field curvature and distortion comprising two compound meniscus components having their air-exposed surfaces concave to a diaphragm between them, a simple collective component in front of such compound components, and two simple collective components behind such compound components, the front and rear surfaces of the simple collective component which is fourth from the front being concave to the front and having radii of curvature respectively lying between 0.5 F and 3 F and between 0.4 F and F, the front and rear surfaces of the simple collective rear component being respectively convex and concave to the front and having radii of curvature respectively lying between 2 F and ∞ and between F and 2 F, the numerical sum of the radii of curvature of the rear surface of the front compound meniscus component and the front surface of the rear compound meniscus component lying between 1.33 and 2.33 times the axial length of the air space between such surfaces, while the axial thickness of the front compound meniscus component lies between 0.1 F and 0.16 F and the axial thickness of the rear compound meniscus component lies between 0.08 F and 0.14 F, where F is the equivalent focal length of the whole objective.

14. An optical objective corrected for spherical and chromatic aberrations, coma, astigmatism, field curvature and distortion comprising two compound meniscus components having their air-exposed surfaces concave to a diaphragm between them, a simple collective component in front of such compound components, and two simple collective components behind such compound components, the sum of the equivalent powers of the two compound meniscus components being dispersive and lying numerically between 0.4 and 0.6 times the convergent equivalent power of the whole objective, the equivalent focal length of the simple collective component which is fourth from the front lying between 1.2 and 2.0 times that of the simple collective rear component, with the sum of such equivalent focal lengths lying between 3 F and 6 F, the numerical sum of the radii of curvature of the rear surface of the front compound meniscus component and the front surface of the rear compound meniscus component lying between 1.33 and 2.33 times the axial length of the air space between such surfaces, while the axial thickness of the front compound meniscus component lies between 0.1 F and 0.16 F and the axial thickness of the rear compound meniscus component lies between 0.08 F and 0.14 F, where F is the equivalent focal length of the whole objective.

15. An optical objective substantially in accordance with the following table:

[Equivalent focal length=1.000]

| Radius | Thickness or Air Separation | Refractive Index $n_d$ | Abbé V Number |
|---|---|---|---|
| $R_1 = +0.5842$ | $D_1=0.0795$ | 1.6935 | 53.50 |
| $R_2 = +1.3333$ | $S_1=0.0020$ | | |
| $R_3 = +0.4094$ | $D_2=0.1060$ | 1.6935 | 53.50 |
| $R_4 = +3.1211$ | $D_3=0.0220$ | 1.6083 | 39.58 |
| $R_5 = +0.2587$ | $S_2=0.2904$ | | |
| $R_6 = -0.2351$ | $D_4=0.0220$ | 1.7003 | 30.28 |
| $R_7 = -0.7194$ | $D_5=0.0854$ | 1.6935 | 53.50 |
| $R_8 = -0.2901$ | $S_3=0.0020$ | | |
| $R_9 = -1.0341$ | $D_6=0.0510$ | 1.6935 | 53.50 |
| $R_{10} = -0.6757$ | $S_4=0.0020$ | | |
| $R_{11} = +4.2230$ | $D_7=0.0600$ | 1.6935 | 53.50 |
| $R_{12} = -1.5925$ | | | | where $R_1$, $R_2$ . . . represent the radii of curvature of the individual surfaces, $D_1$, $D_2$ . . . represent the axial thicknesses of the elements, and $S_1$, $S_2$ represent the axial air separations between components.

References Cited in the file of this patent
UNITED STATES PATENTS

| 2,379,393 | Wynne | June 26, 1945 |
| 2,532,751 | Baker | Dec. 5, 1950 |
| 2,735,339 | Doi | Feb. 21, 1956 |